(12) United States Patent
Beck et al.

(10) Patent No.: US 8,447,983 B1
(45) Date of Patent: May 21, 2013

(54) TOKEN EXCHANGE

(75) Inventors: Joshua James Beck, Minneapolis, MN (US); Daniel Mark Cundiff, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 199 days.

(21) Appl. No.: 13/019,128

(22) Filed: Feb. 1, 2011

(51) Int. Cl.
*H04L 29/06* (2006.01)

(52) U.S. Cl.
USPC .............. 713/172; 705/65; 705/66; 705/67; 726/26

(58) Field of Classification Search
USPC .......................................................... 705/69
See application file for complete search history.

(56) References Cited

U.S. PATENT DOCUMENTS

| | | | |
|---|---|---|---|
| 4,941,176 A | 7/1990 | Matyas et al. | |
| 5,634,122 A | 5/1997 | Loucks et al. | |
| 6,032,216 A | 2/2000 | Schmuck et al. | |
| 6,272,631 B1 | 8/2001 | Thomlinson et al. | |
| 6,356,941 B1 | 3/2002 | Cohen | |
| 6,389,542 B1 | 5/2002 | Flyntz | |
| 6,438,666 B2 | 8/2002 | Cassagnol et al. | |
| 6,766,454 B1 | 7/2004 | Riggins | |
| 7,366,912 B2 | 4/2008 | Sturgis | |
| 7,383,433 B2 | 6/2008 | Yeager et al. | |
| 7,444,414 B2 | 10/2008 | Foster et al. | |
| 7,774,611 B2 | 8/2010 | Muntz et al. | |
| 2002/0032903 A1 | 3/2002 | Sprunk | |
| 2004/0054891 A1 | 3/2004 | Hengeveld et al. | |
| 2004/0145773 A1 | 7/2004 | Oakeson et al. | |
| 2005/0129246 A1 | 6/2005 | Gearhart | |
| 2005/0193191 A1 | 9/2005 | Sturgis | |
| 2006/0235795 A1* | 10/2006 | Johnson et al. | 705/44 |
| 2007/0094503 A1 | 4/2007 | Ramakrishna | |
| 2007/0199071 A1* | 8/2007 | Callas | 726/26 |
| 2008/0040284 A1 | 2/2008 | Hazel et al. | |
| 2008/0077803 A1* | 3/2008 | Leach et al. | 713/189 |
| 2009/0192943 A1* | 7/2009 | Dubhashi et al. | 705/59 |
| 2010/0070754 A1* | 3/2010 | Leach | 713/152 |

OTHER PUBLICATIONS

Encryption at the University of California: Overview and Recommendations, http://www.ucop.edu/irc/itsec/en/EncryptionGuidelinesFinal.html, Apr. 2006.
Mark et al., Shift4 Secure Payment Processing—Tokenization—The Best Way to Secure Data is to Not Store Data, Shift4 Corporation, Aug. 2007.

* cited by examiner

*Primary Examiner* — Jung Kim
*Assistant Examiner* — Janusz Kusyk
(74) *Attorney, Agent, or Firm* — Nixon & Vanderhye P.C.

(57) ABSTRACT

A value is associated with a token within a trust zone. The token is used in place of the value in operations executed within the trust zone. A key is defined for an entity outside of the trust zone. A processor encrypts the token using the key to form an encrypted token that cannot be decrypted by entities outside of the trust zone. The encrypted token is provided to the entity outside of the trust zone.

16 Claims, 9 Drawing Sheets

TOKEN EXCHANGE

BACKGROUND

Systems that collect and work with sensitive data such as credit card numbers, social security numbers, names, and addresses need to take measures to ensure that this information remains secure and cannot be discovered by third parties. One technique for securing sensitive data is to encrypt the data and store it in a secure data base. The encrypted data is then associated with a token that can be used in place of the sensitive data in various applications. When the sensitive data is needed, the token is used to retrieve the encrypted values from the secure data base and the encrypted values are decrypted to provide a cleartext version of the sensitive data.

The discussion above is merely provided for general background information and is not intended to be used as an aid in determining the scope of the claimed subject matter.

SUMMARY

A value is associated with a token within a trust zone. The token is used in place of the value in operations executed within the trust zone. A key is defined for an entity outside of the trust zone. A processor encrypts the token using the key to form an encrypted token that cannot be decrypted by entities outside of the trust zone. The encrypted token is provided to the entity outside of the trust zone.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

The present inventors have determined that tokenization of sensitive data alone is not always sufficient for protecting sensitive data. In particular, in systems where a token is used in place of sensitive data, gaining access to the token can allow a party to perform functions in the same manner as if they had gained access to the sensitive data. For instance, it may be possible for an outside party to use an acquired token to credit an account or to charge items to a different account without knowing the account numbers.

In order to prevent this from occurring, the present inventors have determined that the token should not be allowed outside of a trusted computing boundary when it is accompanied by other account identifying information such as name, address, or other personally identifiable information. This creates difficulties when entities outside of the trusted computing boundary need to associate certain events with a particular token within the trusted boundary.

To overcome this problem, the present inventors have created a technique in which tokens are encrypted before being provided to external entities. Further, to prevent external entities from working together to collect a database of these encrypted tokens, the present inventors have developed a system where each entity has its own token encryption key such that a single token within the trusted computing boundary is encrypted into a different encrypted token for each entity. Under one embodiment, the same token encryption key is used for all tokens for a particular entity. For example, for external entity A, there will be a single token encryption key that will encrypt all tokens when providing encrypted tokens to external entity A. Similarly, external entity B will have its own token encryption key, which will be used to encrypt all tokens provided to external entity B and that is different from the token encrypting key for external entity A. This compartmentalization of the encrypted tokens prevents third parties from pooling their data about a particular transaction or user and thus makes the identity of the transaction or user difficult to determine.

Figure 1:
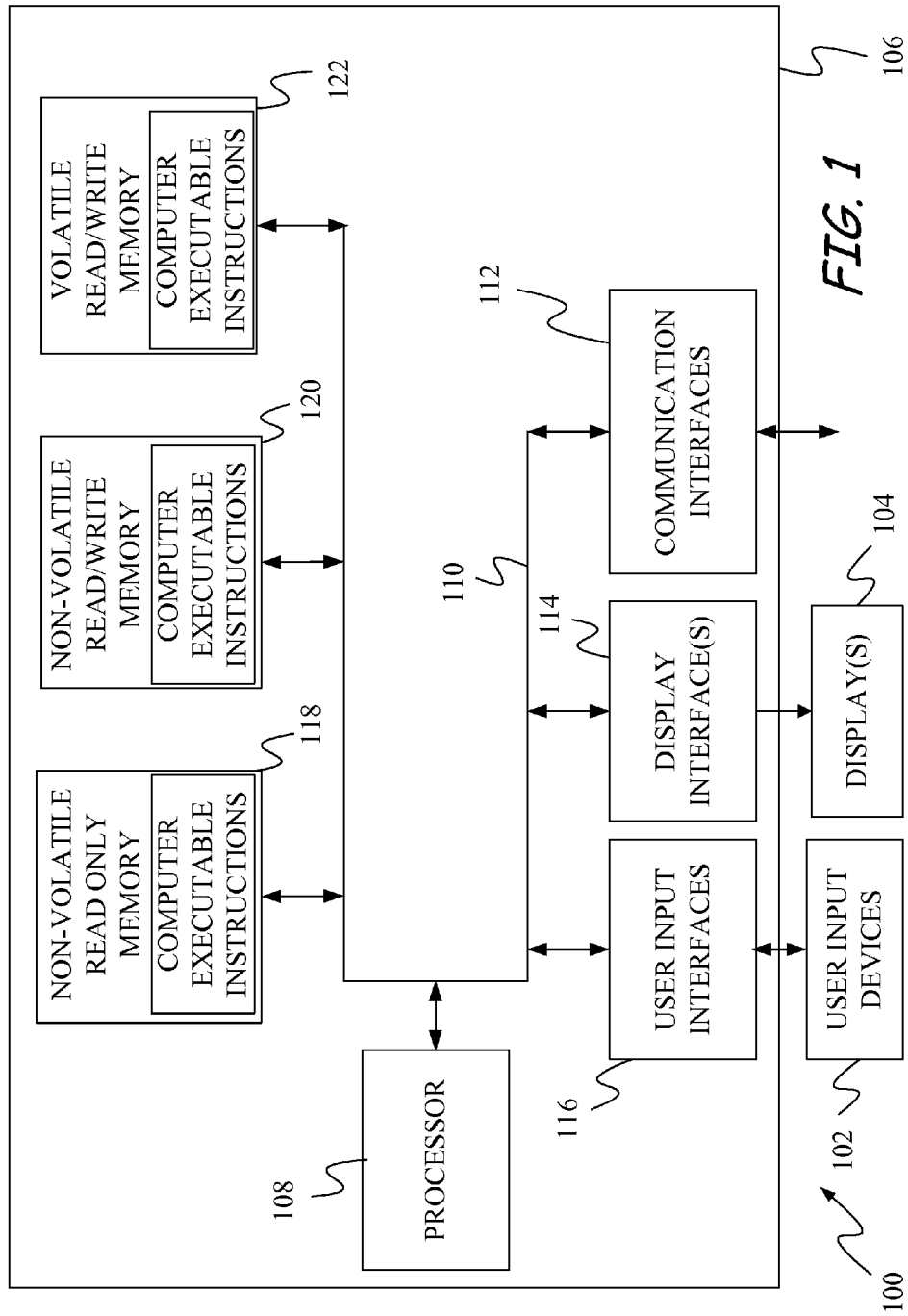
FIG. 1 is a block diagram of a computing environment.

The embodiments described herein are implemented on one or more computing devices that may communicate with each other over one or more networks including local area networks, wide area networks, intranets, and the Internet. FIG. 1 provides a block diagram of an exemplary computing device 100. Computing device 100 includes user input devices 102, display(s) 104, and computing hardware 106. Computing hardware 106 includes a processor 108, which is connected to a bus 110 through which it receives input data and instructions and through which it provides output data and instructions. Bus 110 is connected to communication interfaces 112, display interface(s) 114, user input interfaces 116, non-volatile read only memory 118, non-volatile read/write memory 120, and volatile read/write memory 122. Bus 110 may take the form of a parallel bus or a serial bus and may include any desired bus protocol or size. Processor 108 executes instructions read from non-volatile read only memory 118, non-volatile read/write memory 120, and/or volatile read/write memory 122. Non-volatile read only memory 118, non-volatile read/write memory 120 and volatile read/write memory 122 each represent computer readable storage media having computer executable instructions stored thereon. Examples of non-volatile read/write memory include, but are not limited to, flash memory, CD ROM, digital versatile disks (DVD), or other optical disk storage, magnetic cassettes, magnetic tape, magnetic disk storage, or other magnetic storage devices or any other medium which can be used to write and read desired information and instructions. The non-volatile read/write memory 120 may be removable or non-removable.

Non-volatile read only memory 118 and non-volatile read/write memory 120 provide long term storage for data and instructions such that the data instructions are not lost when power is discontinued at the memory device. Volatile read/ write memory 122, on the other hand, loses the data and instructions stored thereon when power is lost at the memory device.

Processor 108 may include one or more internal caches, which provide internal memory locations for the processor that can be used to increase the execution rate of instructions. The cache memory of processor 108 is typically volatile and as such, values within the cache are lost when power is lost at processor 108.

Processor 108 may also receive data and instructions through communications interfaces 112, which communicate with one or more remote computing systems through one or more networks. Computer executable instructions may be transferred directly through communication interfaces 112 to processor 108 where they can be executed or may be stored on non-volatile read/write memory 120 or volatile read/write memory 122. Computer readable storage media having computer executable instructions may be accessed through communication interfaces 112. These additional computer readable storage media may be located anywhere. When communication interfaces 112 connect with such external computer readable storage media, they create a new machine with computing device 100 that is altered by the computer executable instructions on the external computer readable storage medium.

Figure 2:
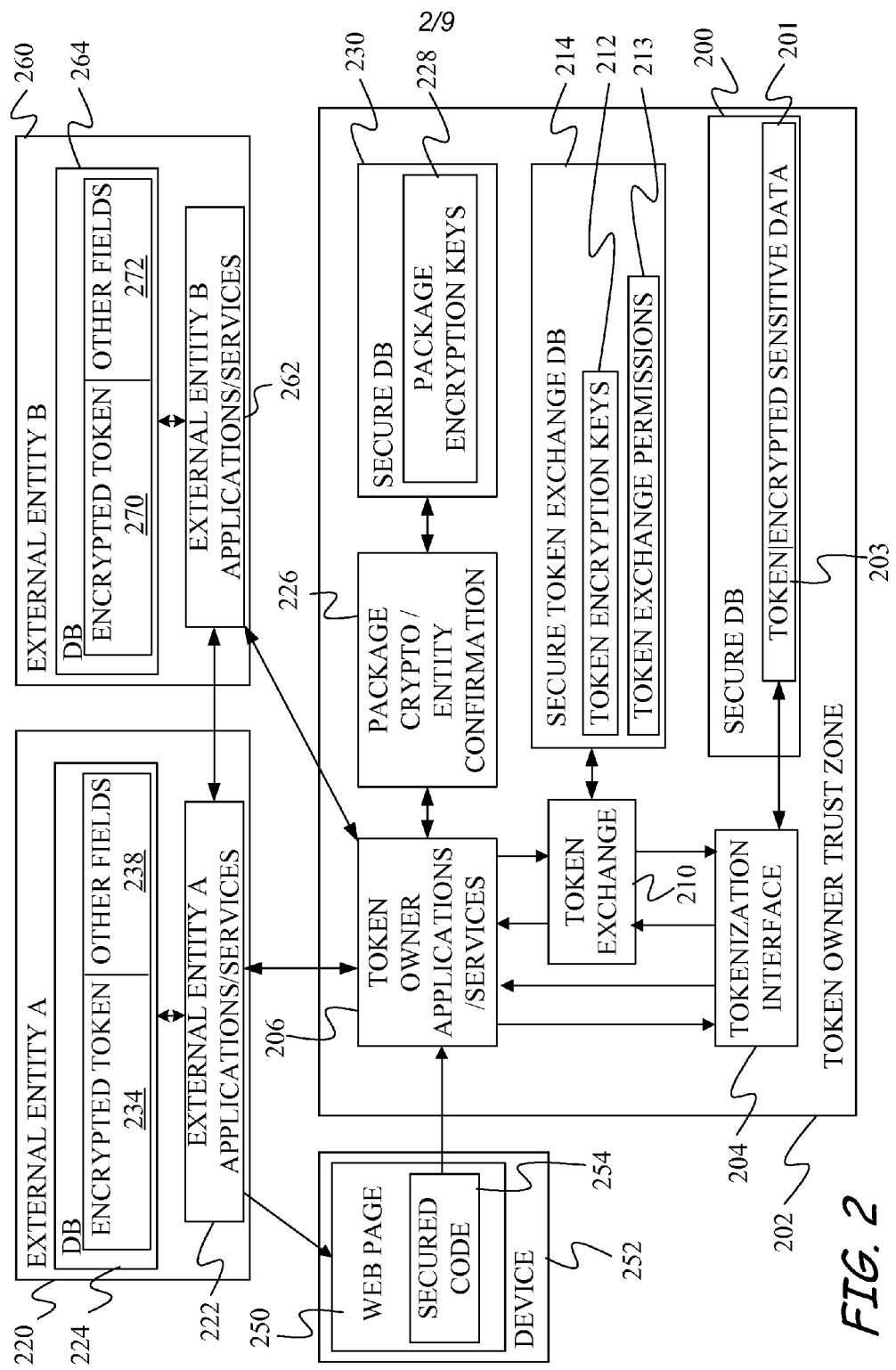
FIG. 2 is a block diagram showing elements used under some embodiments to form and protect tokens used to represent sensitive data.

FIG. 2 provides a block diagram showing elements used under some embodiments to form and protect tokens used to represent sensitive data. In FIG. 2, external entity A 220, external entity B 260, device 252 and components of token owner trust zone 202 may be implemented as one or more computing devices, such as computing device 100 of FIG. 1.

Figure 3:
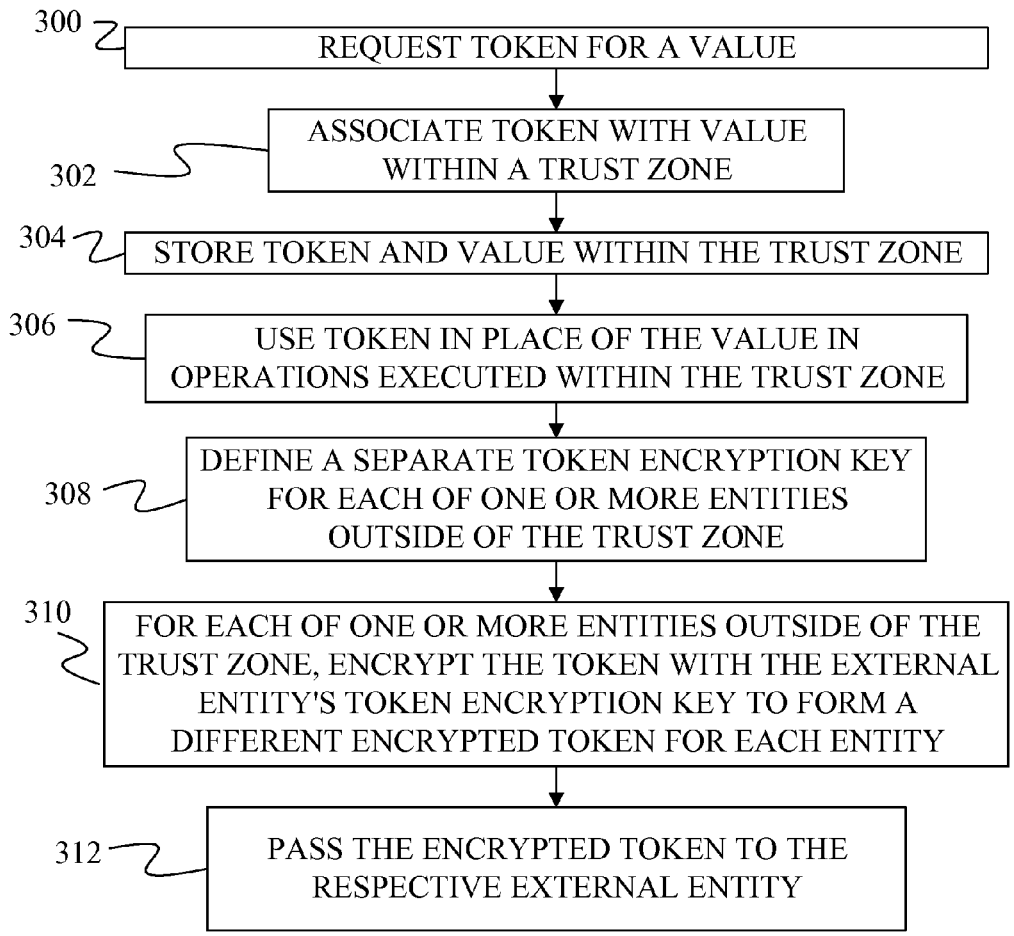
FIG. 3 provides a flow diagram of a method of forming and protecting tokens.

FIG. 3 provides a flow diagram of a method of forming and protecting tokens. In step 300 of FIG. 3, a token owner application/service 206 submits a value, for example a sensitive datum such as a credit card number, a social security number, a birth date, a name, an address, or a phone number, to a tokenization interface 204 and requests that tokenization interface 204 provide a token for the value. At step 302, tokenization interface 204 associates a token with the value and at step 304, stores the token 203 and the value/sensitive data 201 in a database 200 within a trust zone 202 of a token owner. In this context, a trust zone comprises one or more computing and storage devices that a token owner considers to be under its control and protected from unwanted incursions by third parties. Under some embodiments, tokenization interface 204 encrypts the value before storing it in database 200. In step 306, tokenization interface 204 returns the token to the token owner application/service 206 for use in place of the value within trust zone 202.

Token owner applications/services 206 are one or more applications and/or services that perform functions within token owner trust zone 202. The functions performed by token owner applications/services 206 are not intended to be limited in any manner. Token owner applications/services 206 use tokens 203 whenever possible instead of using the sensitive data represented by tokens 203 to thereby limit the storing of sensitive data within token owner trust zone 202. In one particular embodiment, secure database 200 is the only place within token owner trust zone 202 where sensitive data is stored in a non-volatile memory. Token owner applications/services 206 may request the sensitive data from tokenization interface 204 when needed, but token owner applications/services 206 will not store the sensitive data in either encrypted or cleartext form in a non-volatile memory other than secure database 200.

To prevent entities outside of trust zone 202 (external entities) from acquiring tokens and using them directly in token owner applications/services 206, requests for tokens from external entities are processed by a token exchange 210, which encrypts the tokens before providing them to the external entities. Token exchange 210 encrypts a token based on a token encryption key that is unique to the external entity that will receive the encrypted token. Thus, at step 308, a different token encryption key is defined for each of one or more external entities. This means that at step 310, the same token will be encrypted into different encrypted tokens using different token encryption keys for different external entities. Under some embodiments, each external entity has a single token encryption key such that all tokens that are encrypted for an entity are encrypted using the same token encryption key. The token encryption keys 212 are stored in a secured token exchange database 214 that can be accessed only by token exchange 210.

An external entity is any entity outside of trust zone 202. In general, an external entity is any entity using or executing on a computing device that is not completely controlled by the token owner. An external entity can include users, servers, clients, applications, methods, and objects, for example.

The encrypted tokens are passed to the respective external entities at step 312. In general, the encrypted tokens are sent based on a request for the tokens that is submitted by the external entity. Within an external entity, such as external entity A 220, one or more applications and/or services of external entity A applications/services 222 receive the encrypted tokens from token owner applications/services 206 and store the encrypted token 234 in a local database 224 along with other fields 238 associated with the encrypted token. If external entity A 220 is a trusted entity, an external entity A application/service 222 can request sensitive data from token exchange 210 by passing in the encrypted token. However, if an external entity A application/service 222 receives sensitive data, the sensitive data is not stored in non-volatile memory by external entity A 220 and is discarded from volatile memory as soon as possible. External entity A 220 may also pass an encrypted token to a token owner application/service 206 in a call to the token owner application/service 206 to perform certain actions based on the encrypted token.

Token exchange 210 is not limited to providing encrypted tokens in exchange for sensitive data or sensitive data in exchange for encrypted tokens. Entities within token owner trust zone 202, such as token owner applications/services 206, may also use token exchange 210 to exchange unencrypted tokens for either sensitive data or encrypted tokens, to exchange sensitive data for either encrypted or unencrypted tokens, and to exchange encrypted tokens for either unencrypted tokens or sensitive data. In addition, as discussed further below, token exchange 210 can be used to exchange an encrypted token for one entity into an encrypted token for another entity.

Under some embodiments, request parameters are sent to token exchange 210 to request exchanges between tokens, sensitive data, and encrypted tokens. Under one embodiment, the request contains the following parameters:

Request Identifier: an optional, unique identifier of the request for asynchronous response capability;

Token Requester Identifier: a unique identifier of the entity/client that is requesting the exchange;

Data Type: a predetermined value specifying the type of data being submitted in the request such as sensitive data, token or encrypted token;

Transformation Method: an identifier of the desired translation such as sensitive data to encrypted token, encrypted token to sensitive data, sensitive data to token, token to sensitive data, token to encrypted token, and encrypted token to token, encrypted token to masked sensitive data, and token to masked sensitive data;

Mask Character: if masking is requested, the specific masking character;

Data Value: the sensitive data, token or encrypted token to be exchanged;

Masked sensitive data is sensitive data where some of the characters in the data have been replaced with a masking character. For example, all but the last four numbers of a credit card number may be replaced with masking characters under some circumstances.

Token exchange 210 provides the results of the exchange in a response that under some embodiments has the following parameters:

Request Identifier: the identifier provided in the request;

Data Value: the result of the translation (a token, an encrypted token, masked sensitive data, or sensitive data);

Result code: predefined return code indicating success or a particular error code;

Message: a human readable error message for debugging purposes.

Figure 4:
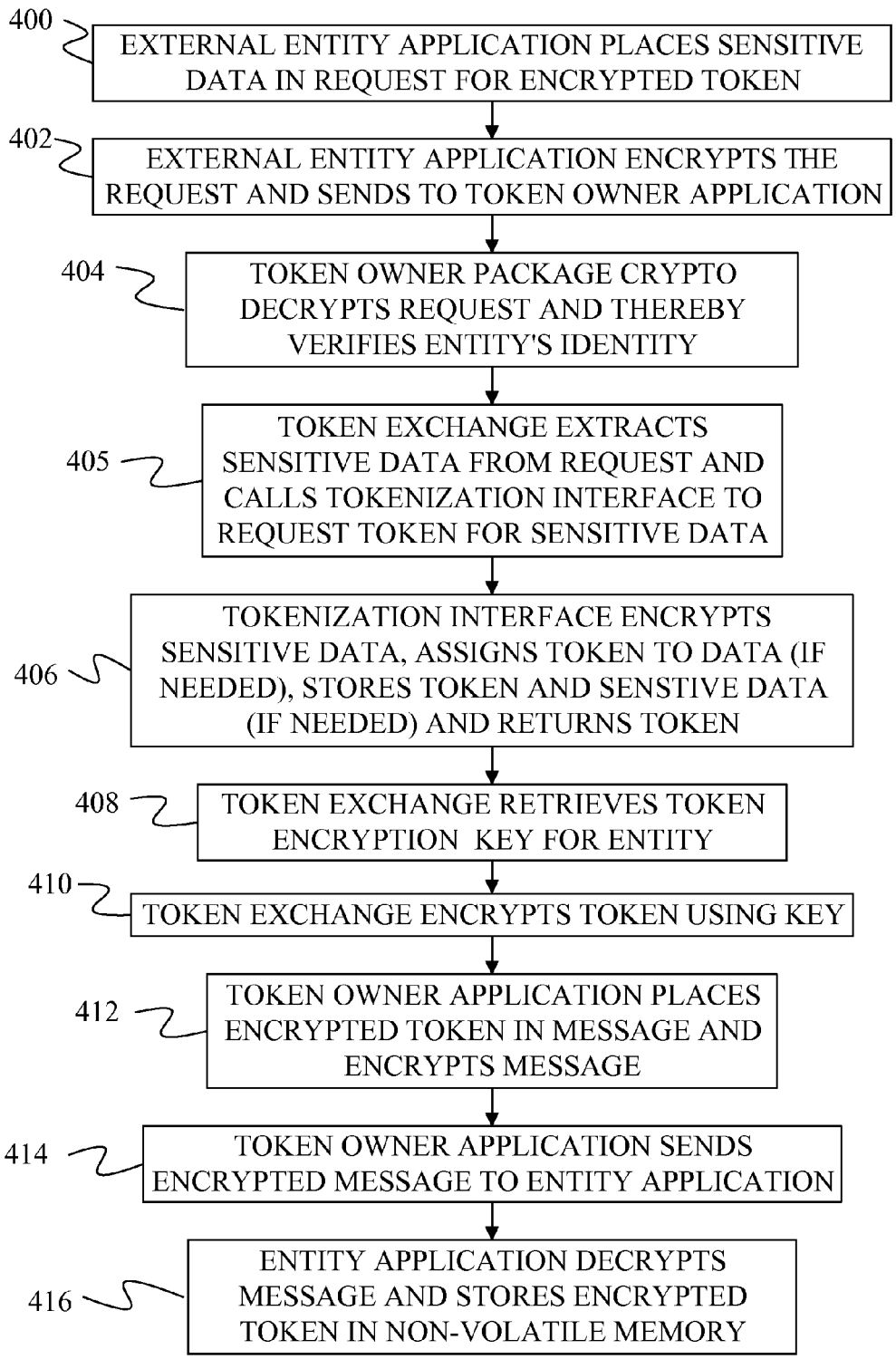
FIG. 4 provides a flow diagram of a method for exchanging sensitive data for an encrypted token.

FIG. 4 provides a method in which an external entity A 220 requests an encrypted token from token owner 202 in exchange for sensitive data that entity A 220 has received. This sensitive data may be received, for example, from a user or a retail register. In step 400, an external entity A application/service 222 of external entity A 220 places the sensitive data in a request for an encrypted token having the format described above. At step 402, external entity A application/service 222 encrypts the request and sends the encrypted request to a token owner application/service 206. Under some embodiments, encrypting the request comprises forming a hash value of the request and using a private key known only to external entity A 220 to encrypt the hash value of the request to form a signature. The signature is then added to the request and a public key is used to encrypt the combination of the request and the signature.

At step 404, the token owner application/service 206 calls package crypto/entity confirmation 226 in token owner trust zone 202 to decrypt the encrypted request. Package crypto/entity confirmation 226 decrypts the request using package encryption keys 228 stored in a secured database 230. The package encryption keys can include a private key and a public key. The private key is the counterpart to the public key used by external entity A application/service 222 to encrypt the combination of the package and the signature and is used to decrypt the combination of the package and the signature. The private key is only known to package crypto 226. The public key is the counterpart to the private key used by external entity A application/service 222 to form the signature and is used to decrypt the signature to retrieve the hash value of the request. The hash value is then compared to a hash of the decrypted request to verify that no changes have been made to the request. If the hash values match, the identity of external entity A 220 is confirmed because only external entity A 220 would have the private key necessary to encrypt the hash value.

Token owner application/service 206 calls token exchange 210 to process the request. Token exchange 210 determines that the request is for an exchange of sensitive data for an encrypted token. At step 405, token exchange 210 extracts the sensitive data from the request and calls tokenization interface 204 to obtain the token for the sensitive data.

At step 406, tokenization interface 204 provides a token for the sensitive data. Under some embodiments, tokenization interface 204 provides the token by first encrypting the sensitive data and determining if the encrypted sensitive data has been previously assigned a token. If the data has previously been assigned a token, tokenization interface 204 retrieves the token 203 from database 200 and returns token 203 to token exchange 210. If the data has not previously been assigned a token, token interface 204 assigns a token to the encrypted sensitive data and stores the token 203 and the encrypted sensitive data 201 in database 200. Token interface 204 then returns the newly assigned token to token exchange 210.

At step 408, token exchange 210 retrieves a token encryption key 212 from token exchange database 214. The token encryption key that is retrieved is unique to external entity A 220 but is unknown to external entity A 220 such that external entity A 220 is unable to decrypt the encrypted token. In fact, under one embodiment, only token exchange 210 is able to decrypt the encrypted token.

At step 410, token exchange 210 uses the retrieved token encryption key to encrypt the token and places the encrypted token in a return message. Token owner application/service 206 then encrypts the message using a public key of external entity A 220 at step 412 and sends the encrypted message to external entity A application/service 222 at step 414. At step 416, external entity A application/service 222 decrypts the message and stores the encrypted token 234 in a secure database 224 together with any other fields 238 that are to be associated with encrypted token 234. In most embodiments, database 224 is stored in a non-volatile memory.

Figure 5:
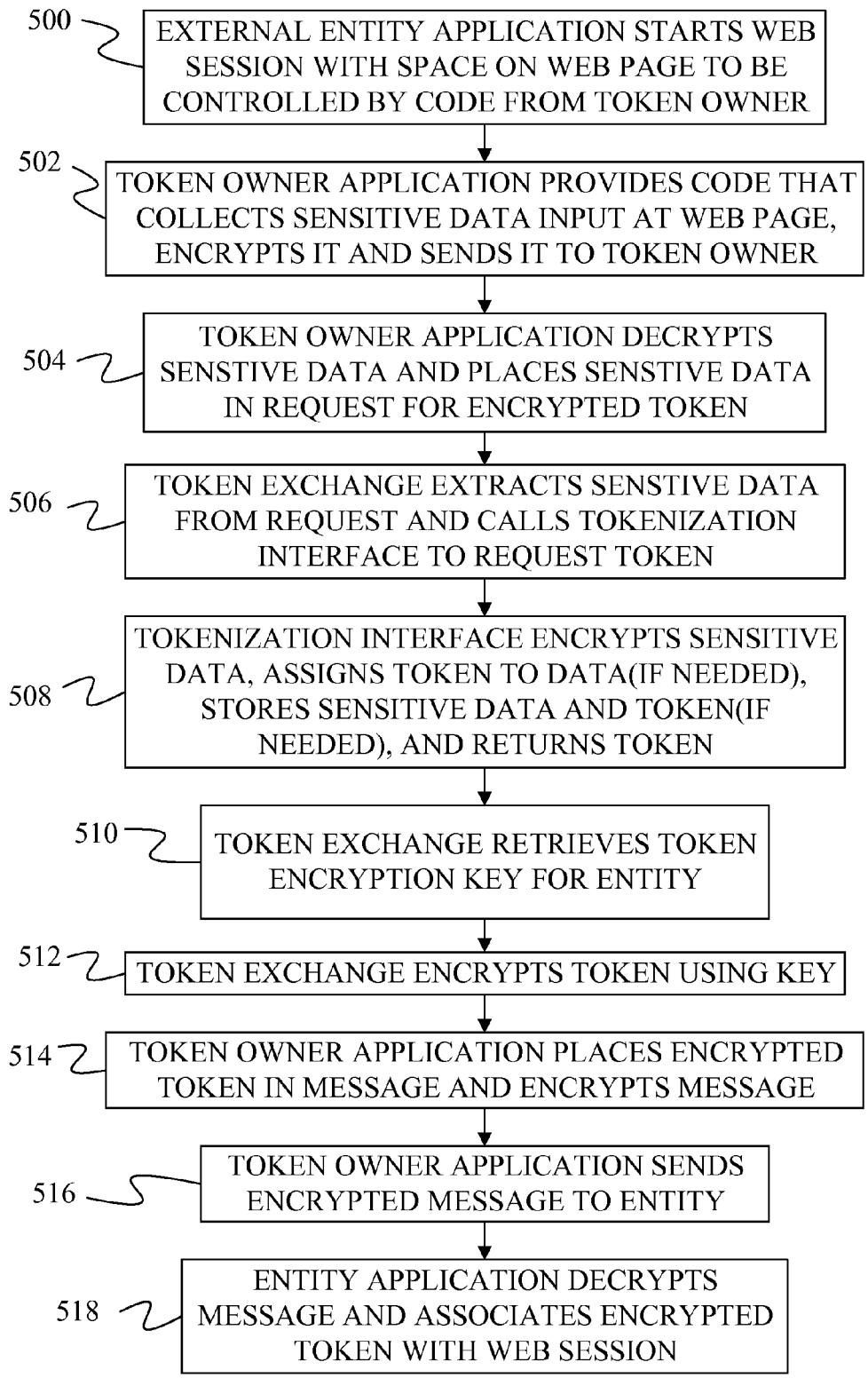
FIG. 5 provides a flow diagram of an alternative method for exchanging sensitive data for an encrypted token.

FIG. 5 provides an alternative method for converting sensitive data into an encrypted token for an external entity. In step 500 of FIG. 5, an external entity A application 222 starts a web session by generating a web page 250 that is provided to a user device 252. Web page 250 includes a space for secured code 254 to be provided by token owner 202. At step 502, a token owner application/service 206 provides the secured code 254, which collects sensitive data input at web page 250, encrypts the sensitive data and sends it to the same or a different token owner application/service 206. The sensitive data is encrypted and sent to the token owner application/service 206 without the sensitive data or the encrypted sensitive data being made available to external entity A 220.

At step 504, token owner application/service 206 decrypts the sensitive data, places the sensitive data in a request for an encrypted token using external entity A 220 as the Token Requester and passes the request to token exchange 210. At step 506, token exchange 210 extracts the sensitive data from the request and calls tokenization interface 204 to obtain the token for the sensitive data.

At step 508, tokenization interface 204 provides a token for the sensitive data. Under some embodiments, tokenization interface 204 provides the token by first encrypting the sensitive data and determining if the encrypted sensitive data has been previously assigned a token. If the data has previously been assigned a token, tokenization interface 204 retrieves the token 203 from database 200 and returns token 203 to token exchange 210. If the data has not previously been assigned a token, token interface 204 assigns a token to the encrypted sensitive data and stores the token 203 and the encrypted sensitive data 201 in database 200. Token interface 204 then returns the newly assigned token to token exchange 210.

At step 510, token exchange 210 retrieves a token encryption key 212 for external entity A 220, wherein the token encryption key 212 is stored in secure token exchange database 214. At step 512, token exchange 210 encrypts the token using the token encryption key and returns the encrypted token to token owner application/service 206 in a response. At step 514, token owner application/service 206 places the response in a message together with a web session identifier that identifies the web session of web page 250. Token owner application/service 206 then encrypts the message. Under one embodiment, the message is encrypted using a public key associated with external entity A 220 such that the message can be decrypted using a private key held by external entity A 220. At step 516, token owner application/service 206 sends the encrypted message to an external entity A application/service 222.

At step 518, external entity A application/service 222 decrypts the message and associates the encrypted token in the decrypted message with the web session based on the web session identifier passed in the message. Through this association, external entity A application/service 222 may store the encrypted token in database 224 with other data associated with the web session that generated web page 250.

Figure 6:
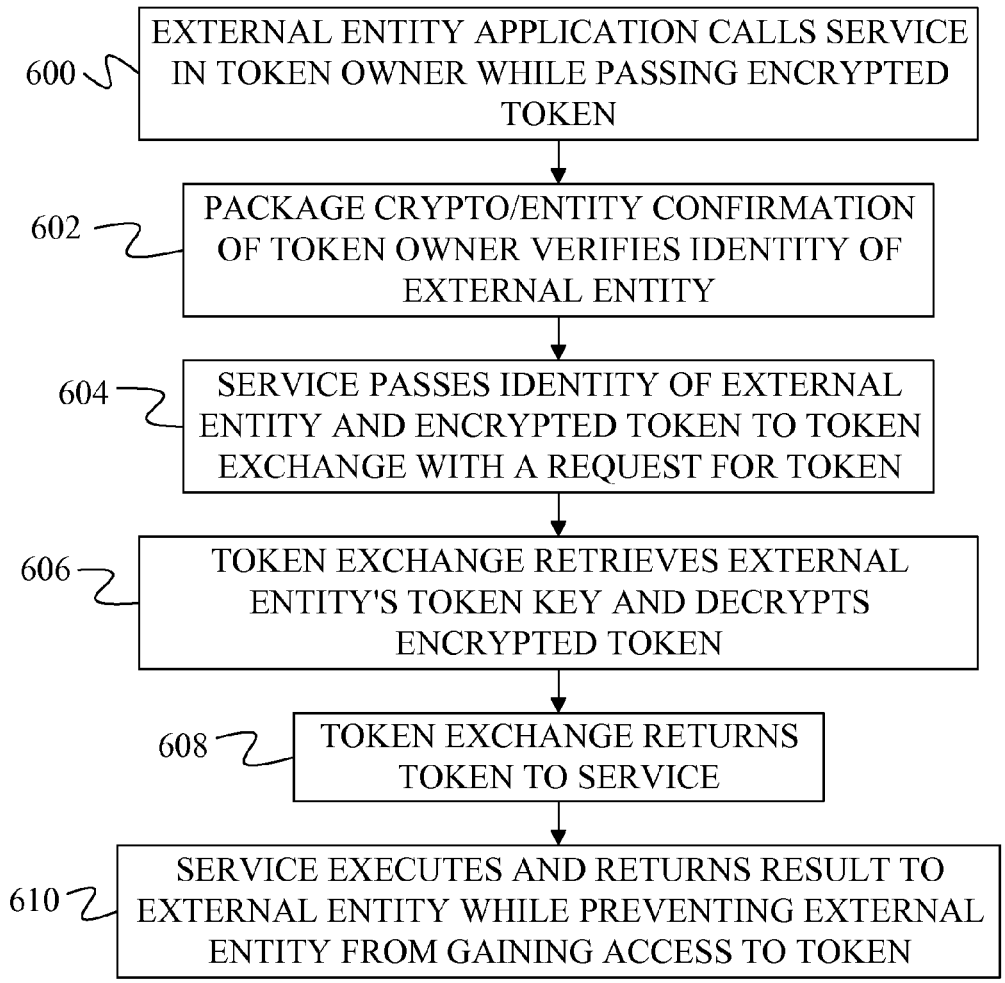
FIG. 6 provides a flow diagram for calling a function to perform relative to an encrypted token.

In some embodiments, an external entity A application/service 222 may request that a token owner application/service 206 perform a function relative to an encrypted token by passing in the encrypted token as part of the call to the token owner application/service 206. FIG. 6 provides an example of one method for making such a request.

In step 600 of FIG. 6, an external entity A application/service 222 calls a token owner application/service 206 while passing in the encrypted token. At step 602, token owner application/service 206 verifies the identity of external entity A application/service 222. Under one embodiment, this verification is performed by decrypting an encrypted message that contains the encrypted token and that was passed to token owner application/service 206 by external entity A application/service 222. Under one embodiment, the encrypted message is decrypted by package crypto/entity confirmation 226 using a private key of package encryption keys 228 held by token owner 202 and a signature of the message is decrypted using a public key associated with external entity A 220. If the signature can be successfully decrypted to form a hash value that matches a hash value computed from the decrypted message, package crypto/entity confirmation 226 verifies that an application/service in external entity A 220 sent the encrypted message.

At step 604, token owner application/service 206 passes the identity of external entity A 220 and the encrypted token to token exchange 210 with a request for the token. In the request, external entity A 220 is identified as the Token Requester. At step 606, token exchange 210 retrieves the token encryption key 212 for external entity A 220 from secure database 214 and decrypts the encrypted token to recover the token. At step 608, token exchange 210 returns the token to token owner application/service 206. Token owner application/service 206 then performs the requested function using the token as input and returns results from performing the function to calling external entity A application/service 222 at step 610. In returning results to external entity A application/service 222, token owner application/service 206 is careful not to provide the token to external entity A application/service 222.

Figure 7:
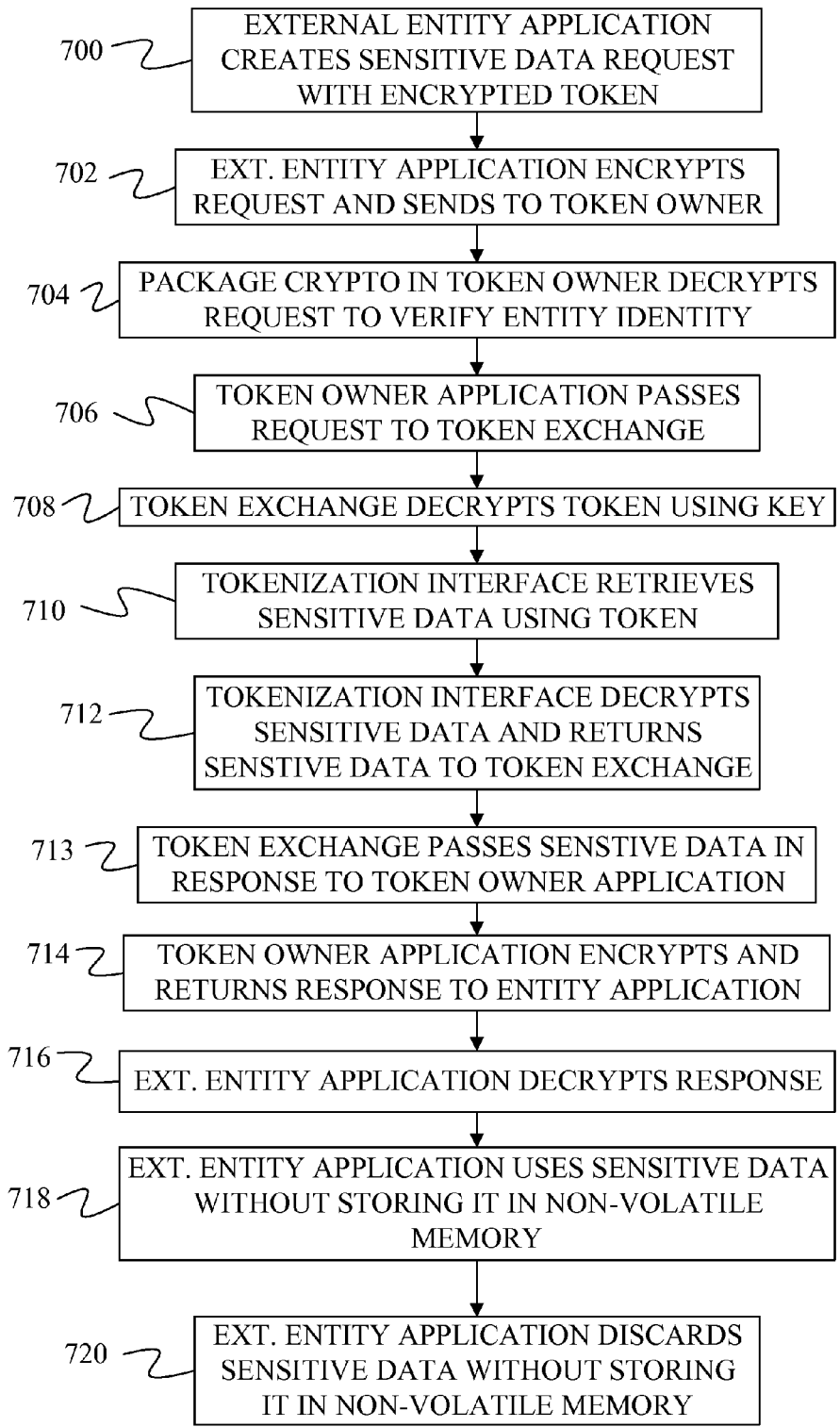
FIG. 7 provides a flow diagram of a method of exchanging an encrypted token for sensitive data.

Some external entities will have rights to receive sensitive data from a token owner. FIG. 7 provides a method of requesting and utilizing sensitive data by submitting an encrypted token.

In step 700 of FIG. 7, an external entity A application/service 222 of external entity A 220 creates a request for encrypted sensitive data associated with an encrypted token. Under one embodiment, the request includes the parameters of the request described above, with the Token Requester parameter being set to external entity A 220, the Data Type parameter being set to sensitive data, the Data Value parameter being set to the encrypted token, and the Transformation Method parameter being set to encrypted token-to-sensitive data.

The external entity A application/service 222 encrypts a combination of the request and a signature for the request at step 702 and sends the encrypted combination to a token owner application/service 206 in token owner trust zone 202.

At step 704, token owner application/service 206 calls package crypto/entity confirmation 226 to decrypt the request and to verify the identity of the external entity A 220. Package crypto/entity confirmation 226 uses packaging encryption keys 228 to decrypt the request and the signature within the request. Under some specific embodiments, the request is decrypted using a private key associated with the token owner and the signature is decrypted using a public key associated with external entity A 220. If the hash value found by decrypting the signature matches a hash value of the request, the identity of external entity A 220 is confirmed.

At step 706, token owner application/service 206 passes the request to token exchange 210. Token exchange 210 uses a token encryption key 212 associated with external entity A 220 to decrypt the token at step 708.

Token exchange 210 calls tokenization interface 204 with the token and requests the sensitive data associated with the token. At step 710, tokenization interface 204 retrieves the encrypted sensitive data using the token as an index into secure database 200. At step 712, tokenization interface 204 decrypts the encrypted sensitive data retrieved from secure database 200 and returns the sensitive data to token exchange 210. Token exchange 210 places the sensitive data in a response and passes the response to token owner application/service 206 at step 713. Token owner application/service 206 encrypts the response and returns the encrypted response to external entity A application/service 222 at step 714. Under one embodiment, the response has the same format as the response discussed above.

At step 716, external entity A application/service 222, decrypts the response to recover the sensitive data. External entity A application/service 222 then uses the sensitive data without storing it in non-volatile memory at step 718. When external entity A application/service 222 is done with the sensitive data, external entity A application/service 222 discards the sensitive data without storing it in non-volatile memory at step 720.

Figure 8:
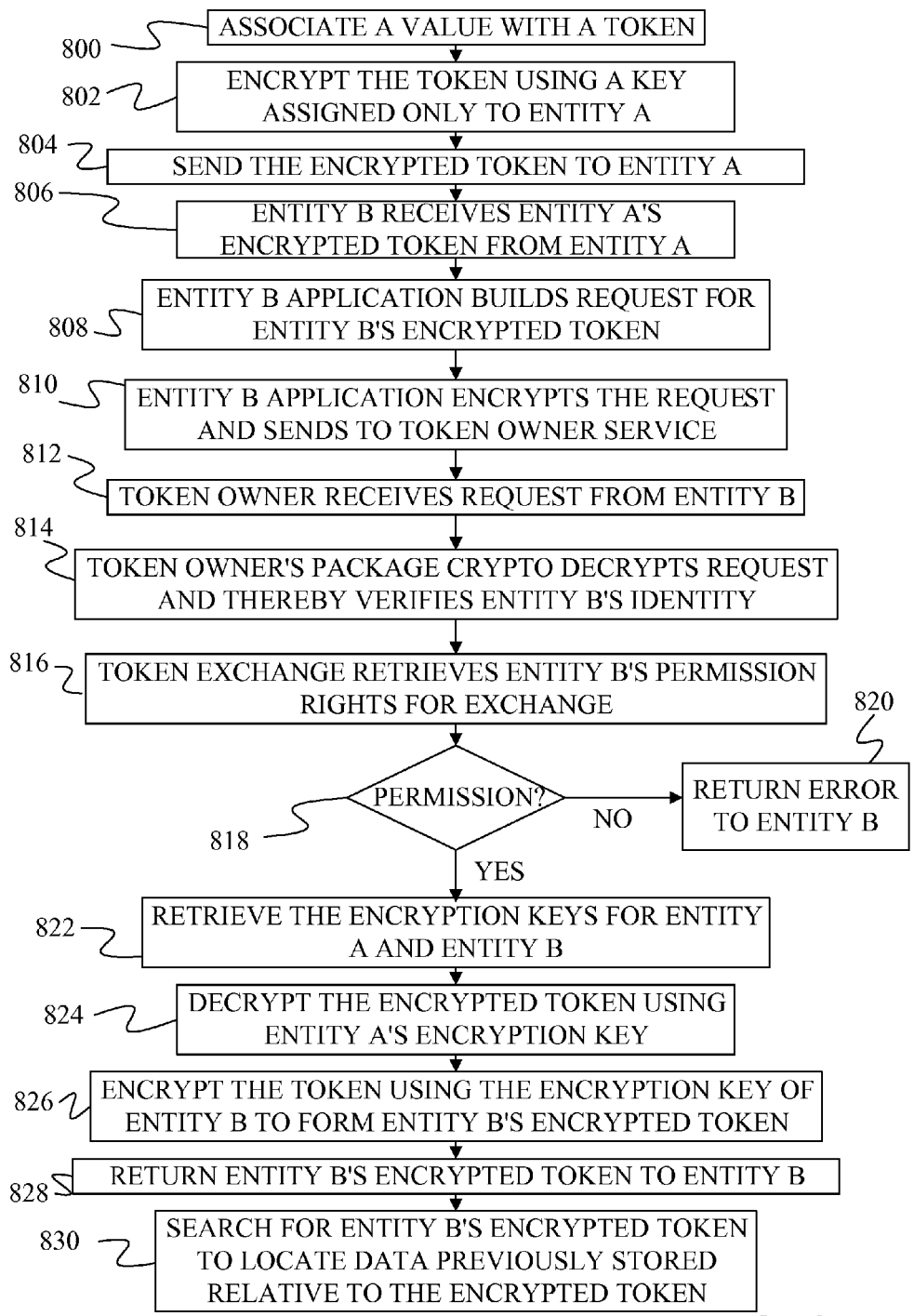
FIG. 8 provides a flow diagram of a method of exchanging a first entity's encrypted token for a second entity's encrypted token.

Under many embodiments, each entity external to the token owner 202 is assigned its own token encryption key 212. As a result, the same token will be converted into different encrypted tokens for different external entities. To facilitate communications between external entities about a specific transaction, card, or user, some embodiments provide a service that will return one entity's encrypted token when given a different entity's encrypted token and the identities of the two entities. FIG. 8 provides an example flow diagram of one such method.

In FIG. 8, a value, for instance a sensitive datum, is associated with a token at step 800 and the association is stored in database 200 by tokenization interface 204. At step 802, token exchange 210 encrypts the token using a token encryption key for a first entity, such as external entity A 220. The token encryption key is assigned only to the first entity. The encryption performed by token exchange 210 is such that the first entity cannot decrypt the encrypted token. In some embodiments, only token exchange 210 is able to decrypt the encrypted token.

At step 804, the encrypted token is sent to a first entity. For example, token exchange can pass the encrypted token through a token owner application/service 206 to an external entity A application/service 222 in external entity A 220.

At step 806, an external entity A application/service 222 passes external entity A 220's encrypted token to an external entity B application/service 262 of external entity B 260. This can be done based on a request from external entity B 260 for external entity A 220's encrypted token or upon external entity A 220's own initiative.

At step 808, an external entity B application/service 262 builds a request to exchange external entity A 220's encrypted token for external entity B 260's encrypted token. Under one embodiment, the request will typically include the following parameters:

Request Identifier: an optional, unique identifier of the request provided for asynchronous response capability;
Token Requester Identifier: unique identifier of the entity requesting the encrypted token;
Exchange Partner Identifier: unique identifier of another external entity whose encrypted token is involved in the exchange;
Data Type: Value specifying the type of data being exchanged;
Transformation Method: One of: Encrypted Token of Requester to Encrypted Token of Exchange Partner; Encrypted Token of Exchange Partner to Encrypted Token of Requester; Encrypted Token of Exchange Partner to Sensitive Data; Sensitive Data to Encrypted token of Exchange Partner; or Encrypted Token of Exchange Partner to Masked Sensitive Data;
Mask Character: If masking is requested, the masking character to use;
Data Value: An encrypted token or sensitive data to be exchanged;

In the request constructed in step 808, the Token Requester parameter would be set to external entity B 260, the Exchange Partner parameter would be set to external entity A 220, the Data Type parameter would be set to Encrypted Token, the Transformation Method parameter would be set to Encrypted token of Exchange Partner to Encrypted token of Token Requester, and the Data Value parameter would be set to the encrypted token of external entity A 220.

At step 810, external entity B application/service 262 encrypts the request along with a signature and sends the encrypted request and signature to a token owner application/service 206. At step 812, token owner application/service 206 receives the encrypted signature and request, which as discussed above includes external entity A 220's identity, external entity B 260's identity, and external entity A 220's encrypted token.

At step 814, token owner application/service 206 passes the encrypted request and signature to package crypto/entity confirmation 226, which decrypts the package and signature and thereby verifies entity B 260's identity. In particular, in some embodiments, the encrypted request is decrypted using a private key held by token owner 202 and the signature of the encrypted request is decrypted using a public key associated with external entity B 260. A hash value in the signature is compared to a hash of the decrypted request and if the hash values match, external entity B 260's identity is confirmed.

At step 816, token owner application/service 206 passes the decrypted request to token exchange 210, which examines the request and based on the request retrieves token exchange permissions 213 for external entity B 260 to determine if external entity B 260 has permission to retrieve its own encrypted token given external entity A 220's encrypted token. If at step 818, external entity B 260 does not have permission to receive its encrypted token based on external entity A 220's encrypted token, token exchange 210 returns an error response to token owner application/service 206, which forwards the error response to external entity B application/service 262 at step 820.

If external entity B 260 has permission to receive its own encrypted token in exchange for external entity A 220's encrypted token, token exchange 210 retrieves external entity A 220's token encryption key and external entity B 260's token encryption key from token encryption keys 212 of secure token exchange database 214 at step 822. At step 824, token exchange 210 decrypts external entity A 220's encrypted token using external entity A 220's token encryption key and at step 826 re-encrypts the token to form external entity B 260's encrypted token using external entity B 260's token encryption key.

At step 828, token exchange 210 places external entity B 260's encrypted token in a response and returns the response to token owner application/service 206, which encrypts the response and passes it to external entity B application/service 262. Under one embodiment, the response has the following elements:

Request Identifier: The identifier found in the request;
Data Value: The encrypted token;
Result Code: Return code indicating success or error code;
Message: Human readable error message for debugging purposes.

At step 830, external entity B application/service 262 searches for the encrypted token in a database 264 to locate data previously stored relative to the encrypted token. In most embodiments, database 264 is stored in non-volatile memory. If the encrypted token is not present in database 264, it may be added by external entity B application/service 262 as encrypted token 270 together with related other fields 272.

Figure 9:
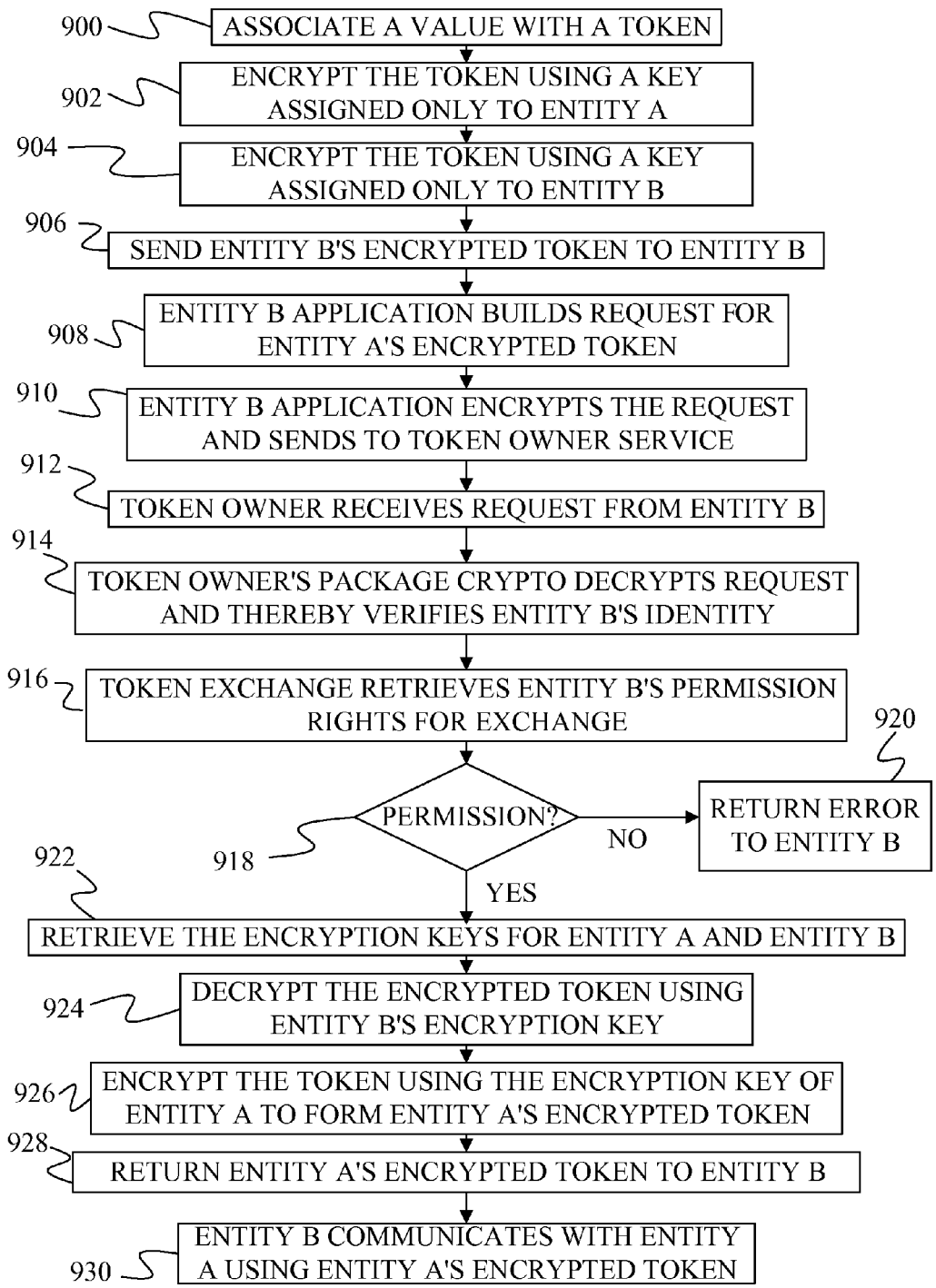
FIG. 9 provides a flow diagram of a second method of exchanging a first entity's encrypted token for a second entity's encrypted token.

FIG. 9 provides an alternative method for external entities to exchange encrypted tokens. In FIG. 9, a value, such as a sensitive datum, is associated with a token at step 900 and the association is stored in database 200 by tokenization interface 204. At step 902, token exchange 210 encrypts the token using a token encryption key for a first entity, such as external entity A 220. The token encryption key is assigned only to the first entity. At step 904, token exchange 210 encrypts the same token using a token encryption key assigned only to a second entity, such as external entity B 260. The encryptions performed by token exchange 210 are such that external entity A 220 and external entity B 260 cannot decrypt the encrypted tokens. In some embodiments, only token exchange 210 is able to decrypt the encrypted tokens.

At step 906, token owner 202 sends external entity B 260's encrypted token to external entity B. For example, token exchange 210 can pass the encrypted token through a token owner application/service 206 to an external entity B application/service 262.

At step 908, an external entity B application/service 262 builds a request to exchange its encrypted token for external entity A 220's encrypted token. Under one embodiment, the request will typically include the following parameters:

Request Identifier: an optional, unique identifier of the request provided for asynchronous response capability;
Token Requester Identifier: unique identifier of the entity requesting the encrypted token;
Exchange Partner Identifier: unique identifier of another external entity whose encrypted token is involved in the exchange;
Data Type: Value specifying the type of data being exchanged;
Transformation Method: One of: Encrypted Token of Requester to Encrypted Token of Exchange Partner;

Encrypted Token of Exchange Partner to Encrypted Token of Requester; Encrypted Token of Exchange Partner to Sensitive Data; Sensitive Data to Encrypted token of Exchange Partner, or Encrypted Token of Exchange Partner to Masked Sensitive Data;

Mask Character: If masking is requested, the masking character to use;

Data Value: An encrypted token or sensitive data to be exchanged;

In the request constructed in step 908, the Token Requester parameter would be set to external entity B 260, the Exchange Partner parameter would be set to external entity A 220, the Data Type parameter would be set to Encrypted Token, the Transformation Method parameter would be set to Encrypted token of Token Requester to Encrypted token of Exchange Partner, and the Data Value parameter would be set to the encrypted token of external entity B 260.

At step 910, external entity B application/service 262 encrypts the request along with a signature and sends the encrypted request and signature to a token owner application/service 206. At step 912, token owner application/service 206 receives the encrypted signature and request, which, as discussed above, includes external entity A 220's identity, external entity B 260's identity, and external entity B 260's encrypted token.

At step 914, token owner application/service 206 passes the encrypted request and signature to package crypto/entity confirmation 226, which decrypts the package and signature and thereby verifies entity B 260's identity. In particular, in some embodiments, the encrypted request is decrypted using a private key held by token owner 202 and the signature of the encrypted request is decrypted using a public key associated with external entity B 260. A hash value in the signature is compared to a hash of the decrypted request and if the hash values match, external entity B 260's identity is confirmed.

At step 916, token owner application/service 206 passes the decrypted request to token exchange 210, which examines the request and based on the request retrieves token exchange permissions 213 for external entity B 260 to determine if external entity B 260 has permission to retrieve external entity A 220's encrypted token in exchange for external entity B 260's encrypted token. If at step 918, external entity B 260 does not have permission to receive external entity A 220's encrypted token, token exchange 210 returns an error response to token owner application/service 206, which forwards the error response to external entity B application/service 262 at step 920.

If external entity B 260 has permission to receive external entity A 220's encrypted token, token exchange 210 retrieves external entity A 220's token encryption key and external entity B 260's token encryption key from token encryption keys 212 of secure token exchange database 214 at step 922. At step 924, token exchange 210 decrypts external entity B 260's encrypted token using external entity B 260's token encryption key and at step 926 re-encrypts the token to form external entity A 220's encrypted token using external entity A 220's token encryption key.

At step 928, token exchange 210 places external entity A 220's encrypted token in a response and returns the response to token owner application/service 206, which encrypts the response and passes it to external entity B application/service 262. Under one embodiment, the response has the following elements:

Request Identifier: The identifier found in the request;
Data Value: The encrypted token;
Result Code: Return code indicating success or error code;
Message: Human readable error message for debugging purposes.

At step 930, external entity B application/service 262 communicates with an external entity A application/service 222 of external entity A 220 using external entity A 220's encrypted token, which is stored in external entity A 220 in database 224 along with associated other fields.

Under some embodiments, external entities are allowed to save the encrypted tokens of others entities and to associate the encrypted tokens of other entities with their own encrypted tokens. Other external entities are not permitted to associate and store encrypted tokens of other entities. Periodic audits of external entity databases may be performed to ensure that encrypted tokens from other entities are not being stored.

Although various methods have been shown as separate embodiments above, portions of each method may be combined with all or part of one or more other methods described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A non-transitory computer-readable storage medium having computer-executable components stored thereon that when executed by a processor cause the processor to perform steps comprising:
    associating a value with a token such that the token can be used to uniquely identify the value;
    encrypting the token to form a first encrypted token using a key associated with only a first client such that the first client cannot decrypt the first encrypted token;
    sending the first encrypted token to the first client;
    receiving the first encrypted token and an identification of the first client from a second client;
    retrieving the key associated with only the first client based on the identification of the first client and using the retrieved key to decrypt the received first encrypted token into a decrypted token, the decrypted token being the same as the token;
    encrypting the decrypted token to form a second encrypted token using a key associated with only the second client such that the second client cannot decrypt the second encrypted token and such that the second encrypted token is different from the first encrypted token; and
    returning the second encrypted token to the second client.

2. The computer-readable storage medium of claim 1 wherein the steps further comprise receiving the first encrypted token and a request for the value from the first client and returning the value to the first client.

3. The computer-readable storage medium of claim 2 wherein the steps further comprise receiving the second encrypted token and a request for the value from the second client and returning the value to the second client.

4. The computer-readable storage medium of claim 1 further comprising securing the token such that the first client and the second client cannot gain access to the token.

5. The computer-readable storage medium of claim 4 further comprising securing the value in a secured database and using the token in place of the value in at least one operation.

6. The computer-readable storage medium of claim 1 wherein before returning the second encrypted token, determining if the second client has permission to receive the second encrypted token.

7. The computer-readable storage medium of claim 1 wherein receiving the first encrypted token and the identification of the first client comprises receiving the first encrypted token and the identification of the first client in a request for the second encrypted token.

8. The computer-readable storage medium of claim 7 wherein receiving the request comprises receiving the request in an encrypted form and verifying that the first client sent the request through steps comprising decrypting the encrypted form to recover the request.

9. A method comprising:
associating a value with a token within a trust zone;
using the token in place of the value in operations executed within the trust zone;
defining a key for an entity outside of the trust zone;
a processor encrypting the token using the key to form an encrypted token that cannot be decrypted by entities outside of the trust zone;
providing the encrypted token to the entity outside of the trust zone;
defining a second key for a second entity outside of the trust zone;
encrypting the token using the second key to form a second encrypted token that cannot be decrypted by entities outside of the trust zone;
providing the second encrypted token to the second entity outside of the trust zone;
receiving a request for the encrypted token from the second entity together with the second encrypted token;
decrypting the second encrypted token using the second key to form a decrypted token;
encrypting the decrypted token using the key to form the encrypted token; and
providing the encrypted token to the second entity outside of the trust zone.

10. The method of claim 9 further comprising receiving the value in encrypted form from code operating as part of a web document, wherein the code is provided from within the trust zone.

11. A method comprising:
a processor receiving a first encrypted token from a first entity, wherein the first entity and the processor are unable to decrypt the first encrypted token, and wherein the first encrypted token identifies sensitive data stored within a trust zone;
the processor submitting the first encrypted token and the identity of the first entity to the trust zone with a request for a second encrypted token that identifies the sensitive data stored within the trust zone;
a token exchange retrieving a token encryption key that is unique to the first entity but is unknown to the first entity, decrypting the first encrypted token using the token encryption key to retrieve a token, and encrypting the token with a second token encryption key that is unique to the second entity but is unknown to the second entity to form the second encrypted token;
the processor receiving the second encrypted token from the trust zone wherein the processor is unable to decrypt the second encrypted token; and
the processor providing the second encrypted token to the first entity, wherein the first entity is unable to decrypt the second encrypted token.

12. The method of claim 11 wherein the processor further requests the sensitive data from the trust zone in part by passing the second encrypted token to the trust zone.

13. A non-transitory computer-readable storage medium having computer-executable instructions stored thereon that when executed by a processor cause the processor to perform steps comprising:
retrieving a first encrypted token from a non-volatile memory where it is used in place of sensitive data, wherein the first encrypted token can only be decrypted by a first entity;
submitting the first encrypted token and an identity of a second entity to the first entity with a request for a second encrypted token that corresponds to the first encrypted token and can be used in place of the sensitive data, wherein the first encrypted token has been stored in a non-volatile memory in the second entity and can only be decrypted by the first entity;
the second entity receiving the second encrypted token from the first entity; and
sending a message that includes the second encrypted token to the second entity.

14. The computer-readable storage medium of claim 13 wherein the steps further comprise:
submitting the first encrypted token to the first entity with a request for the sensitive data;
receiving the sensitive data in response to the request;
using the sensitive data without storing the sensitive data in non-volatile memory; and
discarding the sensitive data without storing the sensitive data in non-volatile memory.

15. The computer-readable storage medium of claim 14 wherein the steps further comprise storing the second encrypted token so that it is associated with the first encrypted token in a non-volatile memory.

16. A method for providing an encrypted token to an external entity implemented on a computing device, the method comprising:
the external entity placing sensitive data in a request for the encrypted token;
the external entity encrypting the request and sending the request to a token owner application/service;
the token owner application/service decrypting the request and accessing a token exchange to process the request;
the token exchange extracting the sensitive data and obtaining a token for the sensitive data;
retrieving a token encryption key from the token exchange, wherein the token encryption key is unique to the external entity but is unknown to the external entity;
the token exchange encrypting the token with the token encryption key and placing the encrypted token in a return message;
the token owner application/service encrypting the return message using a public key of the external entity and sending the encrypted return message to the external entity; and
the external entity decrypting the return message and storing the encrypted token in a secure database.

* * * * *